3,515,667
DRILLING FLUID ADDITIVE
Joe L. Mogg, Roseville, Minn., assignor to Universal Oil Products Company, Des Plaines, Ill., a corporation of Delaware
No Drawing. Filed Dec. 12, 1966, Ser. No. 600,755
Int. Cl. C10m 3/48, 3/22
U.S. Cl. 252—8.5                                  6 Claims

ABSTRACT OF THE DISCLOSURE

Aqueous mixture of an organic compound such as starch, gums and proteins decomposable by enzymatic action, and methylene blue, particularly adapted for use as additive to drilling fluids.

---

This invention relates to drilling fluid additives and more particularly to an improved drilling fluid additive mixture which offers exceptional advantages in drilling fluid operations.

Drilling fluids are used in well drilling operations including water, oil and gas wells. The drilling fluid serves many important functions including cooling and lubricating the bit and drilling pipe, removing cuttings from the hole, furnishing a hydrostatic pressure head, and forming a coating on the walls of the borehole. The coating on the walls should be relatively impermeable during the drilling operation in order to reduce loss of drilling fluid by filtration into the formation. However, in certain cases, for example, water wells, removal of the coating is desirable after the well is completed in order not to reduce yields by mud blockage.

In one embodiment the present invention relates to an aqueous mixture of an organic compound decomposable by enzymatic action, and methylene blue.

A recent development is the use of particular organic compounds as drilling fluid additives. The organic compound is decomposed by enzymatic action and, accordingly, is especially desirable for such use. In other words, the additive serves the purpose of providing a temporary coating on the walls of the bore hole during the drilling operation, but is decomposed and removed by enzymatic action after the drilling operation is finished, thus avoiding the necessity of resorting to other means for removing the coating. A particularly effective organic compound for such use is guar bean processed into a powdered drilling fluid additive. This material is available commercially under the trade name "Revert."

The water soluble portion of the guar bean, also referred to as guar gum or flour, is believed to consist of about 80% galactomannan and 15% protein and water. The processed guar bean swells in water to form a highly viscous solution at very low concentrations.

It is understood that the processed guar bean or other suitable organic compound may be used along with additional compounds or mixtures which are used for specific purposes in drilling fluid operations. For example, when metallic contamination is encountered, the guar gum may be used in admixture with one or more iron-ion inactivating agents such as citric acid, oxalic acid, tartaric acid, etc. which generally will be used in a concentration of from about 0.1% to about 10% by weight of the guar gum.

While the processed guar bean is particularly preferred for use in the present invention, it is understood that other compounds or mixtures may be employed. Other gums include agar, arabic, karaya, tragacanth, etc. In some cases the organic compound may comprise starch, gelatin and other water soluble proteins. It is understood that these various additives are not necessarily equivalent for use in the present invention.

The processed guar bean or other water soluble enzymatic decomposable compounds are sensitive to temperature, pH, enzymatic action, etc. When initiating a well drilling operation, the temperature of the water at the various strata is not always known beforehand. Accordingly, when a higher temperature is encountered as, for example, a temperature above about 100° F., the drilling fluid additive may suffer loss of potency for the purpose intended.

Similarly, when the pH of the drilling fluid is too low as, for example, below about a pH of 2 or too high as, for example, a pH of above about 10, premature decomposition of the processed guar bean may occur. In some cases, the premature decomposition can be avoided by the suitable addition of base or acid as required. Also, as hereinbefore set forth, premature decomposition of the drilling fluid additive may occur by excessive bacteria population.

The optimum time required before decomposition of the drilling fluid additive will vary with the particular well being drilled. For example, when a shallow well is being drilled, the optimum time may be one day or perhaps even less. With the deeper wells, the optimum time may range from two or three days or more. In any event, it is important for the driller to know that the drilling fluid additive is still active for the purpose and has not undergone premature decomposition.

The present invention provides a novel method of ready determination by the driller of the activity of the drilling fluid additive. This is accomplished by utilizing a mixture of the drilling fluid additive and methylene blue. The blue color of the drilling fluid additive informs the driller that the circulating drilling fluid is satisfactory for such use. When the drilling fluid loses its normal color and turns to a mud color or becomes colorless, the operator is alerted to the fact that the drilling fluid no longer is satisfactory. He then may add more of the process guar bean or adopt any other necessary procedure to satisfy his requirements. The use of methylene blue in admixture with the processed guar bean apparently is peculiar in this application.

It is understood that the novel drilling fluid additive mixture of the present invention may be used along with the other materials normally employed in well drilling operations. For example, in some cases bentonite and/or other clays are added to the drilling fluid to provide the desired weighting effect. Also, as mentioned before, alkaline or acidic compounds may be added to control the pH of the drilling fluid.

The methylene blue will be mixed with the processed guar bean in any suitable concentration and may range from about 0.001% to about 1.0% and preferably from about 0.01% to about 0.5% by weight of the processed guar bean. The mixture of processed guar bean and methylene blue is incorporated as a drilling fluid additive in any suitable concentration and may be within the range from about 0.01% to about 5% and generally from about 0.05% to about 1% by weight of the drilling fluid. A normally used concentration is of the order of 6 pounds of the additive mixture per 100 gallons of water.

The additive mixture of the present invention may be incorporated into the drilling fluid in any suitable manner. Both the processed guar bean and methylene blue are solids and preferably are prepared in finely divided or powdered state. These may be mixed dry and added in this manner to the drilling fluid. In another embodiment each of the powders may be added separately to the drilling fluid or formed as separate aqueous solutions and added separately to the drilling fluid. In still another embodiment, an aqueous solution of the processed guar bean and methylene blue may be prepared and the aqueous solution then incorporated into the drilling fluid.

The following example is introduced to illustrate further the novelty and utility of the present invention but not with the intention of unduly limiting the same.

EXAMPLE I

As a specific example, a water well is to be drilled, using rotary drilling equipment. The diameter of the well is about 6 inches and the well will be about 100 feet deep. The mixture used in this example is a dry mixture of the processed guar bean containing about 0.11% by weight of methylene blue. The drilling fluid is prepared by commingling 24 lbs. of the mixture with 400 gallons of water (this is a ratio of 6 lbs. of additive per 100 gallons of water required to drill the hole). The mixing is done in a conventional manner, which will vary with the particular equipment on hand. In this example the mixing equipment is arranged so that the powdered mixture is sifted into a turbulent fluid.

As hereinbefore set forth, the drilling fluid will immediately become blue colored and will remain blue colored as long as the additive remains active. However, upon decomposition of the additive, the mixture will turn to a natural clay color. If this decomposition occurs before the well is completed, then additional additive is required to reestablish the blue color, which means maintaining the proper physical characteristics of the drilling fluid. When the blue color turns to the natural clay color (best done after the well is completed) the drilling contractor knows that the additive has decomposed and the well can be tested for yielding characteristics with actual formation producing abilities being obtained on such a test. This means no mud blockage exsts to provide an erroneous test result.

I claim as my invention:

1. A mixture for use in aqueous drilling fluids consisting essentially of guar gum and from about 0.001% to about 1.0% by weight of methylene blue based on said gum.

2. The mixture of claim 1 further characterized in that the methylene blue is present in an amount of from about 0.01% to about 0.5% by weight based on said gum.

3. The mixture of claim 1 further characterized in that it is a finely divided dry mixture.

4. An aqueous drilling fluid containing from about 0.05 to about 1 wt. percent of the mixture of claim 1.

5. An aqueous drilling fluid containing from about 0.01 to about 5 wt. percent of the mixture of claim 1.

6. The drilling fluid of claim 5 prepared by adding said gum and said methylene blue separately to the drilling fluid.

References Cited

UNITED STATES PATENTS

| 2,259,419 | 10/1941 | Hefley et al. | 252—8.5 |
| 2,273,925 | 2/1942 | Bond et al. | 252—8.5 |
| 2,354,648 | 8/1944 | Bond | 252—8.5 |
| 2,681,704 | 6/1954 | Menaul | 252—8.55 X |
| 2,908,597 | 10/1959 | Owen | 252—8.5 X |

OTHER REFERENCES

Rogers, Composition and Properties of Oil Well Drilling Fluids, second edition, pub. 1953 by Gulf Pub. Co. of Houston, Tex., pp. 406, 408, 409, 414 to 417, 419 and 420.

HERBERT B. GUYNN, Primary Examiner

U.S. Cl. X.R.

106—209